United States Patent [19]

Sasuga et al.

[11] Patent Number: 4,899,225
[45] Date of Patent: Feb. 6, 1990

[54] IMAGE PROCESSING METHOD

[75] Inventors: Kazuyasu Sasuga; Hiroaki Ishizawa; Hisao Suzuki; Masato Toho, all of Kanagawa, Japan

[73] Assignee: Fuji Xerox Co., Ltd., Tokyo, Japan

[21] Appl. No.: 140,129

[22] Filed: Dec. 31, 1987

[51] Int. Cl.$^4$ .............................................. H04N 1/40
[52] U.S. Cl. ..................................... 358/448; 358/462; 358/443
[58] Field of Search ............... 358/282, 283, 443, 448, 358/458, 462

[56]  References Cited
U.S. PATENT DOCUMENTS

| | | | |
|---|---|---|---|
| 4,399,469 | 8/1983 | Lew | 358/282 |
| 4,547,811 | 10/1985 | Ochi | 358/280 |
| 4,554,593 | 11/1985 | Fox | 358/282 |
| 4,577,235 | 3/1986 | Kannapell et al. | 358/462 |
| 4,723,173 | 2/1988 | Tanioka | 358/282 |
| 4,742,400 | 5/1988 | Tsuji | 358/283 |
| 4,748,677 | 5/1988 | Yokomizo | 358/282 |
| 4,751,585 | 6/1988 | Shibazaki | 358/294 |
| 4,817,174 | 3/1989 | Nakatani | 358/448 |

Primary Examiner—Edward L. Coles, Jr.
Assistant Examiner—Jerome Grant, II
Attorney, Agent, or Firm—Finnegan, Henderson, Farabow, Garrett and Dunner

[57] ABSTRACT

The image processing method and related apparatus of the present invention contemplates the steps of setting a two-dimensional image filter to center around a subject picture element switching the coefficient of the two-dimensional image filter on a time-sharing basis during the time an image signal corresponding to one picture element is transferred, taking out a plurality of filter outputs relative to the image signal of the subject picture element, comparing the plurality of filter outputs with each other to identify which one of the character and half tone areas the subject picture element belongs to, and subjecting the image to individual process on an area basis. Accordingly, it is possible to distinguish between the character and half tone areas efficiently with a simple arrangement and simultaneously output an image of good quality.

14 Claims, 4 Drawing Sheets

CHAR. : CHARACTER
HT    : HALF TONE

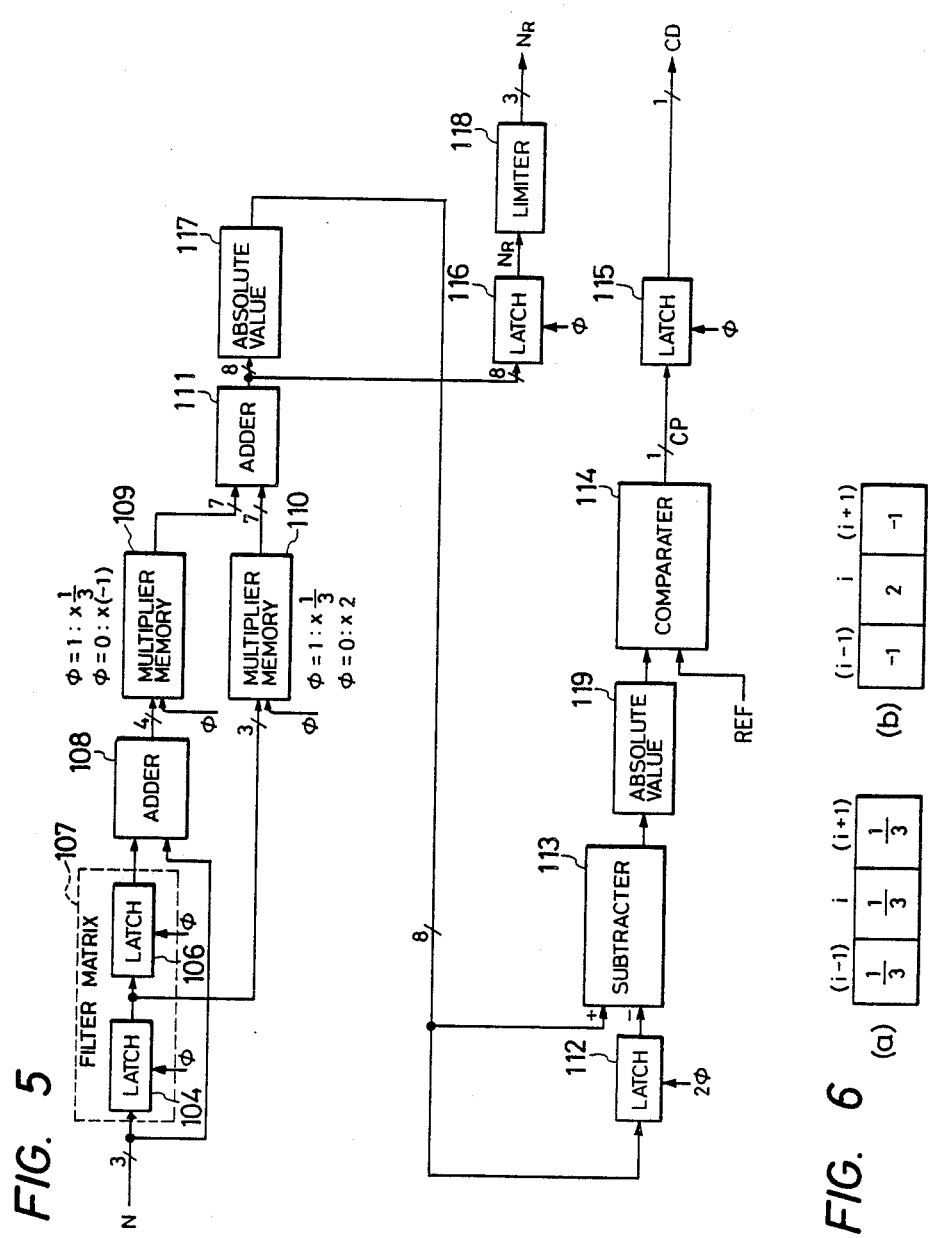

FIG. 7
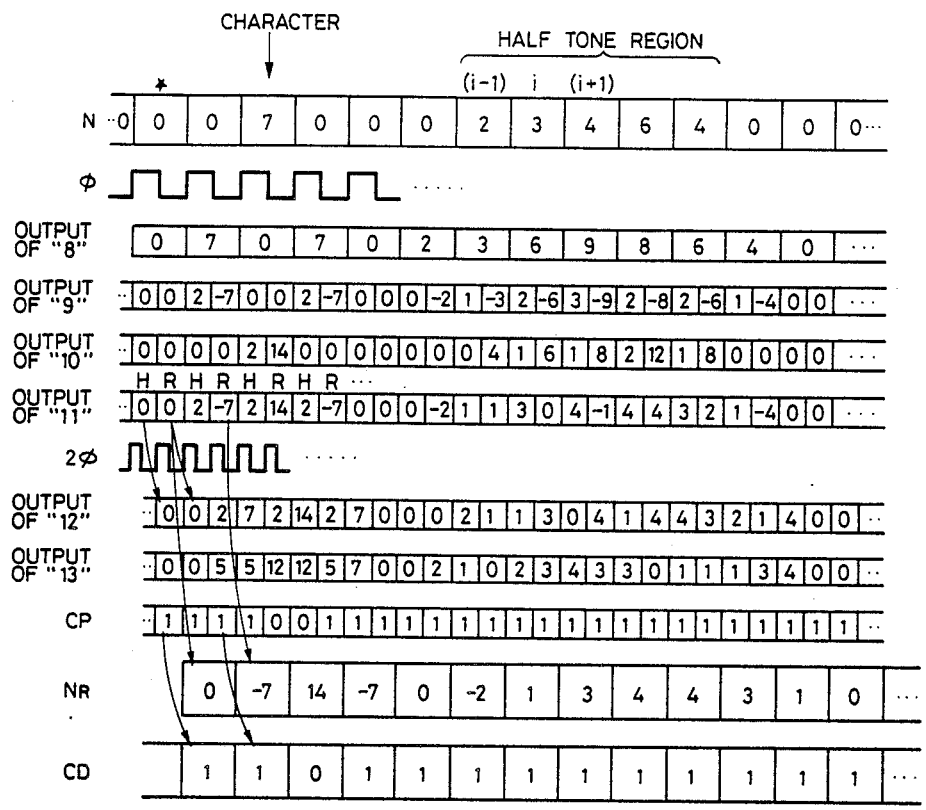
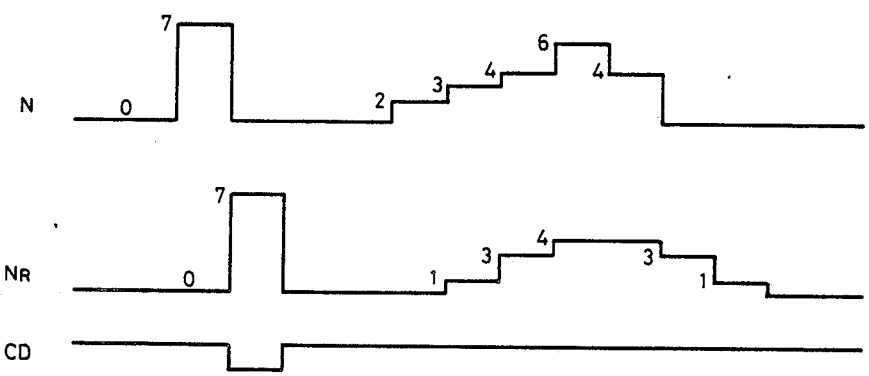

IMAGE PROCESSING METHOD

FIELD OF THE INVENTION

This invention relates to an image processing method applicable to facsimile and copying machines, and more particularly to a method for producing an output by subjecting an image having both a character area and a half tone areas to individual processing on an area basis.

BACKGROUND OF THE INVENTION

Documents transmitted by facsimile or reproduced by copying machines often contain both mixture of characters and photographs, i.e., character and half tone areas. When it is attempted to simply record density signals resulting from reading such documents, images tend to shade off because of the deterioration of the high spatial frequency of an optical reader. Consequently, a half tone generating process such as the "dither" pattern process has been applied to the density signal corresponding to the document to eliminate blur in the image.

However, when the half tone generating process is applied to the density signal corresponding to the document, the problem is that fine lines in the character area tend to increasingly shade off even though the blur in the half tone area is to some extent eliminated.

A known image processing method employs a special discrimination circuit to distinguish between character and half tone areas, applying a border emphasizing process to the half tone area to correct a blur in the image and applying a binary process to the character area to correct blurred fine lines. The special discrimination circuit used to distinguish between the character and half tone areas in the above method has posed a problem in that the hardware tends to be large in scale.

OBJECTS AND SUMMARY OF THE INVENTION

An object of the present invention is to provide an image processing method for simply and efficiently distinguishing between character and half tone areas.

Another object of the present invention is to provide an image processing method for reproducing high quality images of a document including both character and half tone areas.

A further object of the present invention is to provide an image processing method for reproducing high quality images of a document which can be implemented by a compact and simple system.

These and other objects of the present invention have been accomplished by an image processing method for subjecting picture elements representing an image comprised of character and half tone areas to individual enhancement processing on an area basis comprising the steps of setting a two-dimensional image filter centered around a subject picture element, switching the coefficient of the two-dimensional image filter on a time-sharing basis to selected values to output a plurality of filter outputs corresponding to the picture elements, identifying from the plurality of filter outputs which of the character and half tone areas the subject picture element belongs to, and subjecting the subject picture element to selected enhancement processing in response to the identification of the type of area of the subject picture element.

BRIEF DESCRIPTION OF THE DRAWINGS

The manner by which the above objects and other objects, features, and advantages of the present invention are attained will become fully apparent when the following detailed description is considered in view of the accompanying drawings, wherein:

FIG. 2 is a group of schematic diagrams of a two-dimensional image filter implemented by the circuit of FIG. 1;

FIG. 4 is a group of time charts showing input/output signals and input/output data of each portion of the circuit of FIG. 1;

FIG. 5 is a diagram of an image processing circuit using one-dimensional filter for description of the principle of the present invention;

FIG. 6 is a schematic diagram of the one-dimensional image filter implemented by the circuit of FIG. 5; and FIG. 7 is a time chart showing input/output signals and input/output data of each portion of the circuit of FIG. 5.

PRINCIPLE OF THE INVENTION

Figure 1:
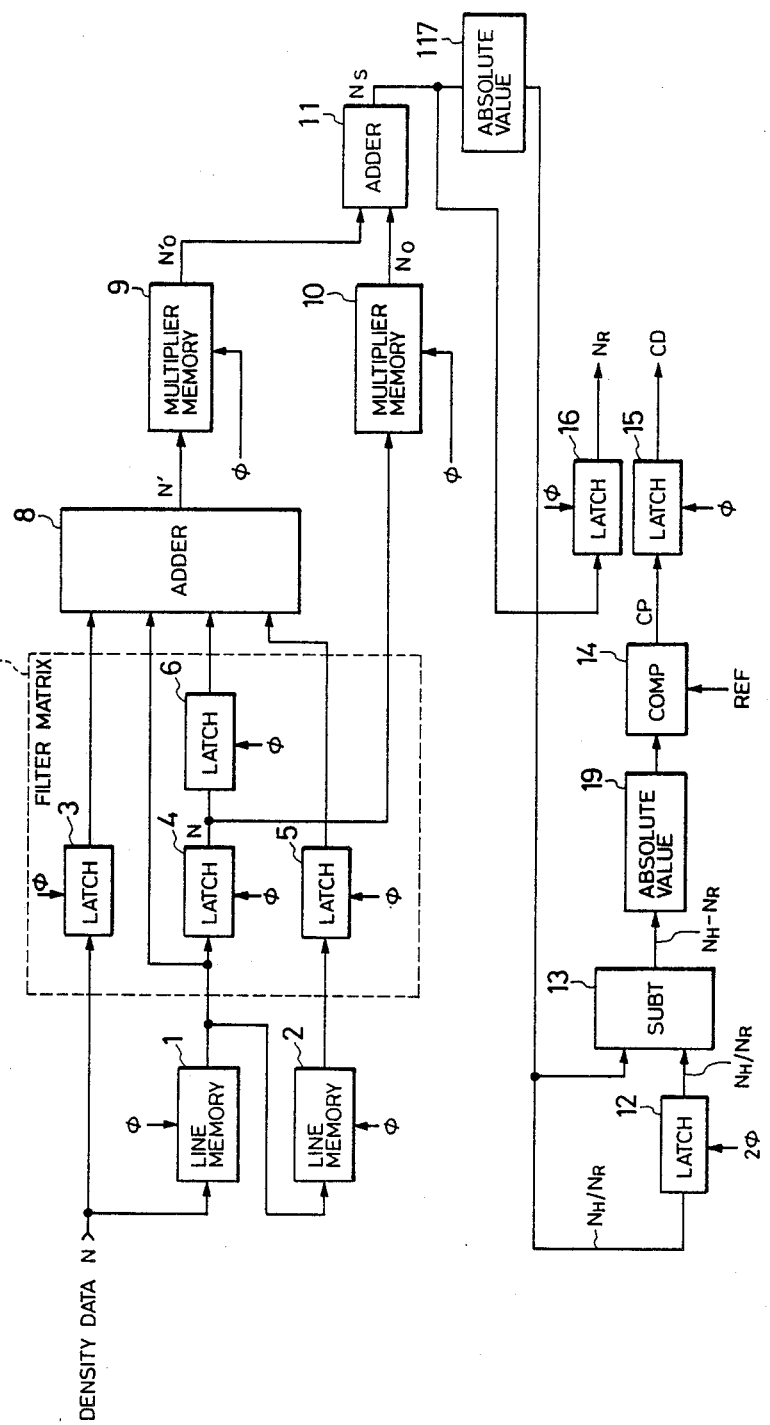
FIG. 1 is a diagram of an image processing circuit for performing the method of the present invention.

For an ease of understanding of the image processing method using a two-dimensional filter in accordance with the present invention, an image processing method which uses a one-dimensional filter will be described with reference to FIGS. 5 through 7.

FIG. 5 is a block diagram showing an image processing circuit using the one-dimensional filter. The term one-dimensional filter as used herein is intended to mean a filter for subjecting an image processing of a subject picture element on the basis of adjacent two data on the same scanning line of the subject picture element.

The density data N on one scanning line is supplied in timed relation to a clock signal $\phi$ to both a one-dimensional image filter 107 and an adder 108.

The density data N on one scanning line is supplied on a picture element basis to both a one-dimensional image filter 107 and an adder 108 in timed relation to a clock signal $\phi$. Assuming that the density data N which has currently supplied is the data corresponding to the (i+1)-th picture element, which data is supplied to both the latch 104 and the adder 108. At this time, the latch 104 outputs the density data corresponding to the i—th picture element preceding to the (i+1)-th picture element on the same line, and the latch 106 outputs the density data corresponding to the (i−1)-th picture element preceding to the i-th picture element. The density data corresponding to the (i−1)-th and (i+1) picture elements are supplied to a first multiplier memory 109, and the density data corresponding to the i-th picture element which is the subject picture element is supplied to the second multiplier memory 110. In the first multiplier memory 109, a value corresponding to ⅓ times the density data which is the addition of the (i+1) and (i−1) picture elements' density data is stored in the lower half of the storage location of the memory when the clock signal $\phi$ is equal to "1", and value corresponding to −1 (minus one) times the summed density data is stored in the upper half of the storage location of the memory when the clock signal is equal to 0. In the second multiplier memory 110, a value corresponding to ⅓ times the density data of the i-th subject picture element is stored in its lower half of the storage location of the memory when the clock signal $\phi$ is equal to "1", and value corresponding to twice the density data of the subject picture element is stored in its upper half of the storage location of the memory when the clock signal is equal to 0.

More specifically, referring to FIG. 7, assuming that the density data corresponding to the (i−1)-th, i-th and (i+1)-th picture elements are represented by 2, 3, and 4, respectively, then the adder 108 outputs "6" when the density data corresponding to the (i+1)-th picture element has now been received. At this time, the first multiplier memory 109 outputs "2" and "−6" when the clock signal $\phi$ is "1" and "0", respectively. The second multiplier memory 110 outputs "1" and "6" when the clock signal $\phi$ is "1" and "0", respectively.

With the foregoing operations, the filters having the filter coefficients shown in FIGS. 6(a) and 6(b) can be accomplished, in which FIG. 6(a) shows the filter coefficient for the smoothing process and FIG. 6(b) shows the filter coefficient for the border emphasizing process. The filter shown in FIG. 6(a) is used for processing the half-tone regions of the image data and the filter shown in FIG. 6(b) is used for processing the character regions of the image data.

Referring back to FIGS. 5 and 7, the outputs of the first and second multiplier memories 109 and 110 are added in the adder 111. That is, when the clock signal $\phi$ is "1", "3" is outputted from the adder and when the clock signal $\phi$ is "0", "0" is outputted therefrom.

The outputs of the adder 111 is supplied to both an absolute circuit 117 and a latch 116. The absolute circuit 117 converts a minus value to a corresponding positive value if applicable.

The density data for the smoothing processing (this data will be hereinafter referred to as "NH") and the density data for the border emphasizing processing (this data will be hereinafter referred to as "NR") are sequentially stored in a latch 112, and are sequentially read out of the latch 112 in timed relation to the clock signal 2$\phi$. Therefore, the density data NH and NR are sequentially outputted from the latch 112 after a delay of ½ of the period $\phi$. In a subtractor 113 to which the data NH and NR are inputted, a difference between the data NH and NR is computed and the resulting data is applied through an absolute value circuit 119 which converts the negative value to a corresponding positive value, if applicable, to a comparator 114. In the comparator 114, the output of the absolute value circuit 119 is compared with a reference value REF and if the result of comparison shows NH-NR less than REF, a signal CP having a value of "1" is outputted by the comparator 114 if NH-NR is greater than REF, the signal CP having a value "0" is produced from the comparator 114.

If the subject picture element exists in the half tone area, the blur thereof will become large because of the smoothing process. Accordingly, NH will become smaller causing NH-NR to be greater than the reference value REF. In consequence, the signal CP will have the value "0". On the contrary, if the subject picture element exists in the character area, the blur will be less because of the smoothing process. NH will not become small and NH-NR will be smaller than the reference value REF. Consequently, the signal CP will be produced with a value of "1".

Thus, the output signal CP of the comparator 114 indicates in which one of the character and half tone areas the subject picture element exists and is latched by a latch 115 which, outputs a character area discriminating signal CD. Moreover, the data NR subjected to the border emphasizing process and produced in the second half period of the clock pulse $\phi$ is latched and outputted by the latch 116.

Accordingly, when the discriminating signal CD is "1", the data produced by the latch 116 is converted into a binary value through a binarization process and recorded so as to record a presentation of a clarified image in the character area. In addition, the half tone area is not subject to binarization and, by recording the data NR as subjected to the border emphasizing process, a representation of a less shades image can be recorded.

DETAILED DESCRIPTION OF THE PREFERRED EMBODIMENTS

According to the method of the present invention, a two-dimensional image filter is centered around the subject picture element. The coefficient of a two-dimensional image filter is switched on a time-sharing basis during the time an image signal corresponding to one picture element is transferred to extract a plurality of filter outputs relative to the image signal of the subject picture element. The filter outputs are compared with each other to identify which one of the character and half tone areas the subject picture element belongs to and, in consequence, to subject the image to appropriate individual processing on an area basis. By setting at least one of the coefficients of the two-dimensional image filter to emphasize the border, it becomes possible to efficiently distinguish between the character and half tone areas with the addition of only a comparator to the circuit.

FIG. 1 is a diagram showing an image processing circuit for practicing the method of the present invention, wherein the density data N corresponding to a document image read by an optical reader (not shown) is received on a picture element basis and the density data N of picture elements covering one scanning line is stored in line memories 1 and 2. Since the density data N is inputted in accordance with a clock signal $\phi$, the line memories 1 and 2 operate so as to shift the density data N on a picture element basis in accordance with the clock signal $\phi$ and successively store them.

When density data stored in the line memory 1 is set as the subject picture element, density data corresponding to the scanning line preceding to the line of the subject picture element is stored in the line memory 2. If density data corresponding to a newly supplied line is received, density data of three consecutive scanning lines are simultaneously obtained.

Figures 2A, 2B, 3:
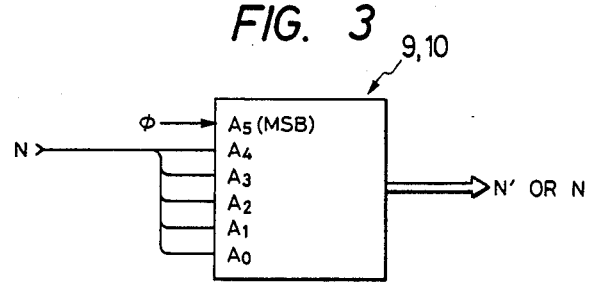
FIG. 2(a) is a filter coefficient matrix for the border emphasizing process.
FIG. 2(b) is a filter coefficient matrix for the smoothing process.
FIG. 3 is a diagram showing the construction of a multiplier memory used in the circuit of FIG. 1.

The density data of the three lines are supplied to a two-dimensional image filter matrix 7 constituted by latches 3-6. Within an area of 3×3 picture elements of the filter matrix, the subject picture element is disposed on the center of that area. As shown in FIG. 2(a), the filter coefficient K=5 is allotted to the subject picture element whereas K=1 (minus one) is assigned to picture elements adjacent on the upper, lower, left and right. This arrangement is intended to provide a border emphasizing process. In FIG. 2(b), the filter coefficient K=1/5 is allotted to the subject picture element and also to the adjacent upper, lower, left and right picture elements of the subject picture element. This arrangement is intended to provide a smoothing process.

The density data of the subject picture element is stored in the latch 4 in accordance with the clock pulse; the density data of the right picture element, i.e., the preceding picture element on the same line is stored in the latch 6. The density data of the picture element adjacent in the top direction of FIG. 2(a), i.e., one line preceding to the line of the subject picture element in scanning order, is stored in the latch 3. The density data of the lower picture element adjacent in the bottom direction FIG. 2(a), i.e., one line following the line of the subject picture element, is stored in the latch 5. In this case, the density data corresponding to the picture element adjacent on the left to the subject picture element is provided by the memory position in the final stage of the line memory 1. The density data of the picture element located on the lower left diagonal with respect to the subject picture element is provided by the memory position in the final stage of the line memory 2.

In order to apply the process of the present invention by means of the filter coefficients shown in FIGS. 2(a) and (b), the outputs of the line memory 7 the latches 1, 3, 5, are 6 and summed in an adder 8. The sum is then supplied to a first multiplier memory 9. Simultaneously, the density data of the subject picture element is outputted from the latch 4 to a second multiplier memory 10.

In the first and second multiplier memories 9 and 10, as shown in FIG. 3, the clock pulse $\phi$ is applied to the terminal of the most significant bit (MSB) $A_5$ and the density data N' from the adder 8 and N from the latch 4 are applied to the lower bit terminals $A_0$ through $A_4$ of the multiplier memories 9 and 10, respectively. The first multiplier memory 9 stores a value corresponding to $-1$ times the density data N' at an addressed storage location in the upper half of its storage location when $\phi$ is equal to "0" and stores in the lower half a value equal to 1/5 times the density data N' at an addressed storage location in the lower half of its storage location when $\phi$ is equal to "1".

In the case of the multiplier memory 10, a value corresponding to 5 times the density data N is stored in a storage locations in the upper half of its storage location when $\phi$="0". A value equal to 1/5 times the density data N is stored in a storage location in the lower half of the storage locations when $\phi$="1". Thus, in each of the first and second multiplier memories 9 and 10, the upper half area of the storage location are accessed when the clock pulse $\phi$ is "0" and the lower half area of the storage locations area accessed when the clock pulse $\phi$ is "1".

Figure 4A:
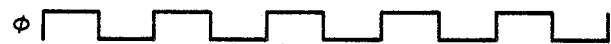
FIG. 4(a) is a time chart showing clock signal, $\phi$.
Figure 4B:
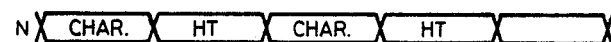
FIG. 4(b) is a time chart showing density data, N.
Figure 4C:
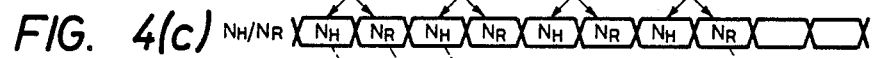
FIG. 4(c) is a time chart showing density data, NH after smoothing and NR after border processing.

Accordingly, assume density data N representative of picture elements of a sequence of character and half tone data are supplied in the following order, character (CHAR), a half tone (HT), a character (CHAR), and half tone (HT), as shown in FIG. 4(b). Then, the first half of the clock period, i.e., when the clock pulse becomes "1", the density data N'o equal to 1/5 times of the total sum of the density data N' of the upper, lower, left and right picture elements adjacent to the subject picture element is outputted from the first multiplier memory 9, whereas the density data No. equal to 1/5 times the value of the density data N of the subject picture element is outputted from the second multiplier memory 10.

In the second half of the clock period, i.e., when the clock pulse $\phi$ becomes "0", the density data N'o equal to the negative of the total sum of the density data N' of the upper, lower, left and right picture elements adjacent to the subject picture element is outputted from the first multiplier memory 9, whereas the density data No equal to 5 times the value of the density data N of the subject picture element is outputted from the second multiplier memory 10.

Accordingly, when the outputs N'o and No of the first and second multiplier memories 9 and 10, respectively, are added in an adder 11, the sum Ns provided from the adder 11 is representative of the density data of the subject picture element after smoothing and border emphasizing processes have been performed on a time-sharing basis.

In other words, the output Ns comprises density data NH obtained by subjecting the subject picture element to the smoothing process in the first half period of the clock signal $\phi$ and the density data NR obtained by subjecting the subject picture element to a border emphasizing process in the second half period of the clock signal $\phi$.

Figure 4D:
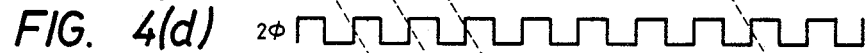
FIG. 4(d) is a time chart showing clock signal, $2\phi$.
Figure 4E:
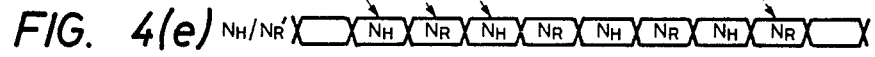
FIG. 4(e) is a time chart showing density data NH and NR after delay of $\frac{1}{2}\phi$.

The density data NH and NR are sequentially stored in the latch 12 in timed relation to the clock signal $2\phi$ (FIG. 4(d)). The density data NH and NR are sequentially outputted from the latch 12 after a delay of ½ of the period $\phi$.

The output of the latch 12 is supplied to a subtractor 13 while delay by the ½ period of the clock pulse $\phi$ and the difference between that data and the data outputted from the adder 11 is obtained. That is, the difference between NH and NR is obtained. Then, the data of the difference is applied through an absolute value circuit 19 to a comparator 14 where it is compared with a reference value REF to check whether it is greater than the REF.

If the result of comparison shows NH-NR less than REF, a signal CP having a value of "1" is outputted by the comparator 14 if NH-NR is greater than REF, the signal CP having a value "0" is produced from the comparator 14.

Figure 4F:
FIG. 4(f) is a time chart showing a comparator output, CP.

If the subject picture element exists in the half tone area, the blur thereof will become large because of the smoothing process. Accordingly, NH will become smaller causing NH-NR to be greater than the reference value REF. In consequence, the signal CP will have the value "0". On the contrary, if the subject picture element exists in the character area, the blur will be less because of the smoothing process. NH will not become small and NH-NR will be smaller than the reference value REF. Consequently, the signal CP will be produced with a value of "1". FIG. 4(f) shows the signal CP representing the results of comparisons.

Figure 4G:
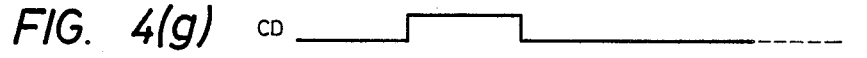
FIG. 4(g) is a time chart latched comparator output, CD.

Thus, the output signal CP of the comparator 14 indicates in which one of the character and half tone areas the subject picture element exists and is latched by a latch 15 which, as shown in FIG. 4(g), outputs a character area discriminating signal CD. Moreover, the data NR subjected to the border emphasizing process and produced in the second half period of the clock pulse φ is latched and outputted by the latch 16.

Accordingly, when the discriminating signal CD is "1", the data produced by the latch 16 is converted into a binary value through a binarization process and recorded so as to record a presentation of a clarified image in the character area. In addition, the half tone area is not subject to binarization and, by recording the data NR as subjected to the border emphasizing process, a representation of a less shades image can be recorded. Since the border emphasizing process is simultaneously used for distinguishing between the character and half tone areas, it is unnecessary to add a special discrimination circuit. Consequently, the apparatus can be made small and simple in construction and be used efficiently for a series of image processes.

What is claimed is:

1. An image processing method for subjecting a plurality of picture elements representing an image comprised of character and half tone areas to a plurality of individual enhancement processing on an area basis, the method comprising the steps of:
   reading out density data corresponding to a respective one of the plurality of picture elements;
   setting a two-dimensional image filter centered around a subject picture element corresponding to one of the plurality of picture elements;
   switching coefficients of said two-dimensional image filter on a time-sharing basis to a plurality of sets of selected values, at least one of said plurality of sets of selected values corresponding to one of said plurality of individual enhancement processings to output a plurality of filter outputs corresponding to said plurality of picture elements;
   selecting one of said character and half tone areas corresponding to said subject picture element, based on said plurality of filter outputs; and
   subjecting said subject picture element to related enhancement processing in accordance with said selected area corresponding to said subject picture element.

2. An image processing method according to claim 1, wherein said step of selecting includes the step of comparing said plurality of filter outputs to each other.

3. An image processing method according to claim 2, wherein said corresponding one of said plurality of individual enhancement processings comprises a process for emphasizing the border of said subject picture element.

4. An image processing method according to claim 3, wherein one of said plurality of sets of selected values corresponds to a process for smoothing said subject picture element.

5. An image processing method according to claim 1, wherein said step of subjecting comprises the substeps of:
   subjecting said subject picture element to related enhancement processing other than said corresponding one of said plurality of enhancement processings at times when said selected area corresponding to said subject picture element is said character area; and
   outputting said plurality of filter outputs associated with said coefficients of said two-dimensional filter having one of said plurality of sets of selected values corresponding to said corresponding one of said plurality of individual enhancement processings at times when said selected area corresponding to said subject picture element is said half tone area.

6. An image processing method according to claim 4, wherein said step of subjecting comprises the substeps of:
   subjecting said subject picture element to a binarization process at times when said selected area corresponding to said subject picture element is said character area; and
   outputting said filter outputs associated with said coefficients of said two-dimensional filter having one of said plurality of sets of selected values corresponding to said process for emphasizing the border of said subject picture element.

7. An image processing apparatus for subjecting a plurality of picture elements representing an image comprised of character and half tone areas to a plurality of individual enhancement processings on an area basis, said apparatus comprising:
   means for reading out density data corresponding to a respective one of the plurality of picture elements;
   a two-dimensional image filter centered around a subject picture element corresponding to one of the plurality of picture elements;
   means for switching coefficients of said two-dimensional image filter on a time-sharing basis to a plurality of sets of selected values, at least one of said plurality of sets of selected values corresponding to one of said plurality of individual enhancement processings to output a plurality of filter outputs corresponding to said plurality of picture elements;
   means for selecting one of said character and half tone areas corresponding to said subject picture element, based on said plurality of filter outputs; and
   means for subjecting said subject picture element to related enhancement processing in accordance with said selected area corresponding to said subject picture element.

8. An image processing apparatus according to claim 7, wherein said selecting means includes means for comparing said plurality of filter outputs to each other.

9. An image processing apparatus according to claim 8, wherein said one of said individual enhancement processings comprises a process for emphasizing the border of said subject picture element.

10. An image processing apparatus according to claim 9, wherein one of said plurality of sets of selected values corresponds to a process for smoothing said subject picture element.

11. An image processing apparatus according to claim 7, wherein said subjecting means includes:
    means for subjecting said subject picture element to related enhancement processing other than said corresponding one of said plurality of enhancement processings when said selected area corresponding to said subject picture element is said character area; and
    means for outputting said plurality of filter outputs associated with said coefficients of said two dimensional filter having one of said plurality of sets of selected values corresponding to said corresponding one of said plurality of individual enhancement processings at times when said selected area corresponding to said subject picture element is said half tone area.

12. An image processing apparatus according to claim 10, wherein said subjecting means includes:
- means for subjecting said subject picture element to a binarization process when said selected area corresponding to said subject picture element is said character area; and
- means for outputting said plurality of filter outputs associated with said coefficients of said two-dimensional filter having one of said plurality of sets of selected values corresponding to said process for emphasizing the border of said subject picture element.

13. An image processing apparatus according to claim 7, wherein said switching means includes:
- memory means for storing a plurality of sets of values, each of said plurality of sets of values corresponding to a product of said density data of the picture elements and said coefficients of said two-dimension filter having said plurality of sets of selected values;
- means for outputting said plurality of sets of values; and
- means for adding values in each of said plurality of sets of values with values in another of said plurality of sets to output a corresponding one of said plurality of filter outputs.

14. An image processing apparatus according to claim 8, wherein said comparing means includes:
- means for subtracting said plurality of filter outputs from each other to obtain a difference value; and
- means for comparing the difference value with a predetermined value.

* * * * *